8765X
B. Hinkley,
Anti-Friction Roller.
Patented Apr. 14, 1835.
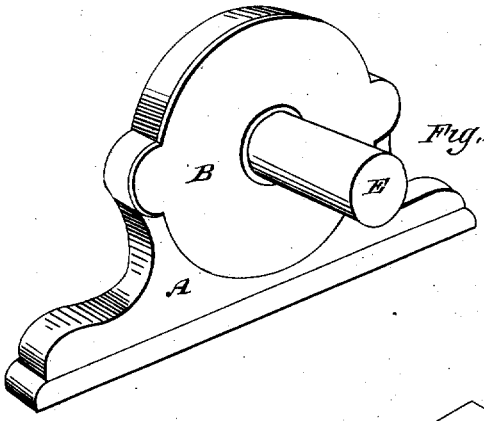
Fig. 1.
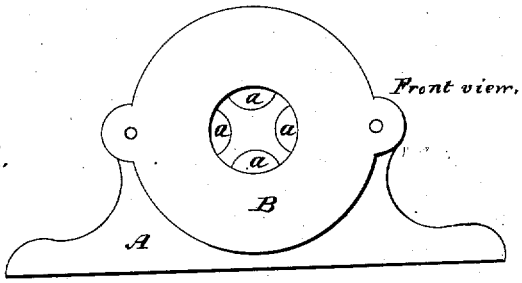
Front view.
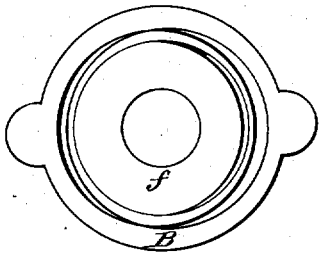
Fig. 3.
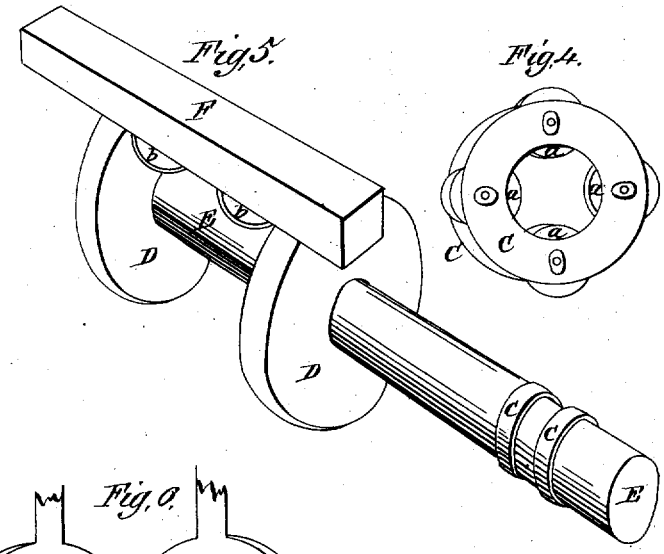
Fig. 5.
Fig. 4.
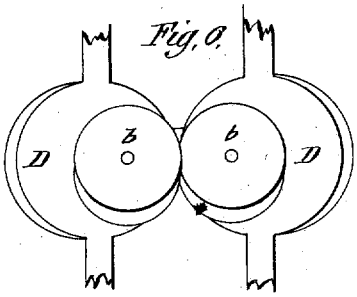
Fig. 6.
The Helictype Printing Co. 220 Devonshire St. Boston.

8765X April 14. 1835

Benjamin Hinckley of Fayette Maine

Letters Patent.

The Schedule referred to in these Letters Patent and making part of the same contain ing a description in the words of the said Benjamin Hinkley himself of his improvement in the mode of diminishing friction on the bearings of shafts axeltrees & other machinery.

To all to whom these presents shall come. Be it known that I Benjamin Hinkley of Fayette in the County of Kennebec and State of Maine. Machinist. have in vented a new and useful improvement in the mode of diminishing friction on the bearings of axeltrees shafts gudgeons and other machinery and that the follow ing is a full and exact description of the construction and operation of the said machinery as invented and improved by me. Fig 2nd of the prefixed draw ings which constitute a part of this description represents a front view of the Box and rollers without the shaft being inserted. A represents the outside of the box. B represents the outside of the plate making a part of the Box. dddd. represents four small anti friction rollers running in the box. Fig 1 represents the whole of the box with the shaft inserted. B the plate. A. the outside of the Box. Fig 3. represents the inside of the plate B. of Fig 3 the rim of the plate and f the part of the surface within the projection forming the groove in the box Fig 4 represents the bands and rollers as they are when in the box. C.C. are the bands intended to keep the rollers in their places formed with ob long holes in which the pivot of the rollers play aaaa. represent the rollers. These four first described figures of the drawings constitute what I call the anti friction box and may be formed of cast iron or any other suitable metal.

Fig 5. represents the shaft or axeltree with two centre wheels and two anti friction Rollers playing between the wheels. E. represents the shaft. D.D. the centre wheels upon the shaft. F a small section of the frame work of a carriage. or other frame work b.b. are two antifriction rollers plying between the two centre wheels in such a manner as to prevent side friction of the rollers inside of the box. E represents the end of the shaft which comes through the hub of the wheel when used on Carriages C.C. show the projection on each side of the groove in the shaft in which the rollers in the Box are intended to run and this groove will be the bearing of the shaft. Fig 6. represents a view of the

87657 two centre wheelz [illegible] described with the antifriction rollers between them. The two centre wheelz with the antifriction rollerz are intended to take off the side friction. and the box rollers are intended to take off the friction of the bearings. These can be applied to carriages Millz Steamboats or in any other machinery where a shaft iz used. I do not pretend to do away with all friction upon a shaft. but the arrangement of the rollers taking the bearing on the outer edges of the rollerz will materially diminish the friction. Having described my said improvement, and the manner in which it iz intended to operate. I do hereby declare that what I claim az new and for which I ask the exclusive use consists in the mode herein before described of applying antifriction rollerz between the cylinder shaft or other parts of machinery and the Box herein before described. the attaching this Box to a carriage body or frame work. The groove in this shaft or axeltree and in this box to keep the rollers and the shaft in their respective placez so az to prevent the interference with each others motion The two centre wheels upon the shaft with the two antifriction rollerz between them az herein before described to diminish side friction and the arrangement of the several parts of the machinery az herein before described Benjn Hinkley Exd. Witnesses
H.H.C. John Otis
Wm. M. Vaughan (Drawing.) (750 words)